July 2, 1946.   W. P. LEAR   2,403,094
TORQUE PRESELECTING MECHANISM
Filed Aug. 17, 1943   2 Sheets-Sheet 1
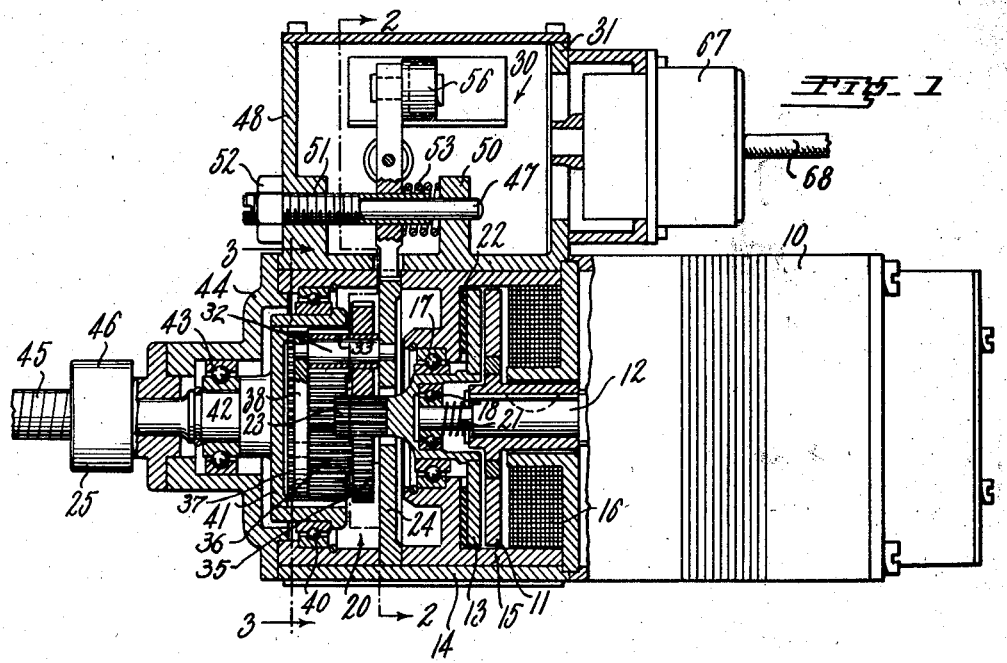
Fig. 1
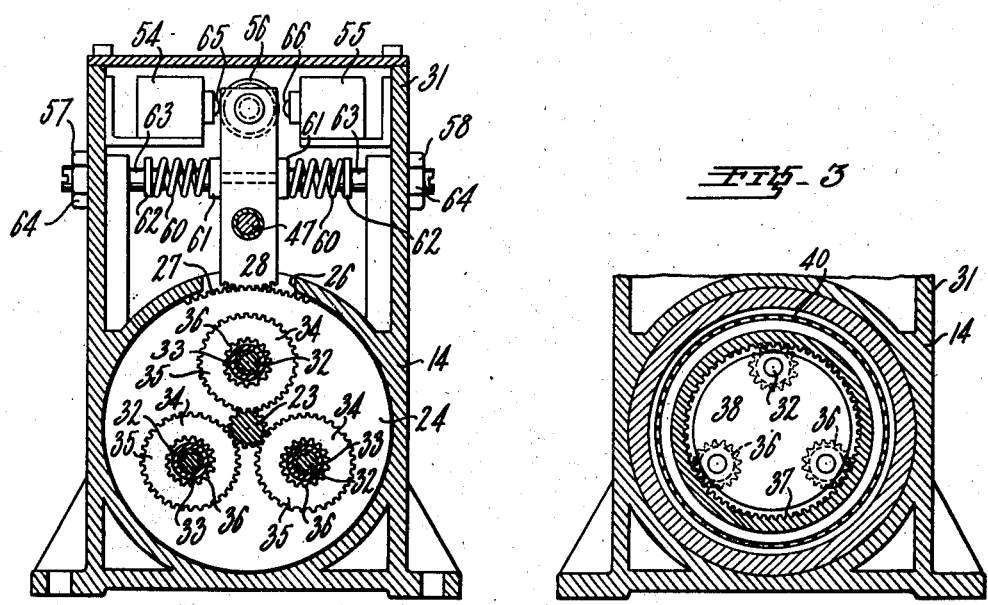
Fig. 2
Fig. 3
INVENTOR.
WILLIAM P. LEAR
BY Richard A. Marsen
ATTORNEY

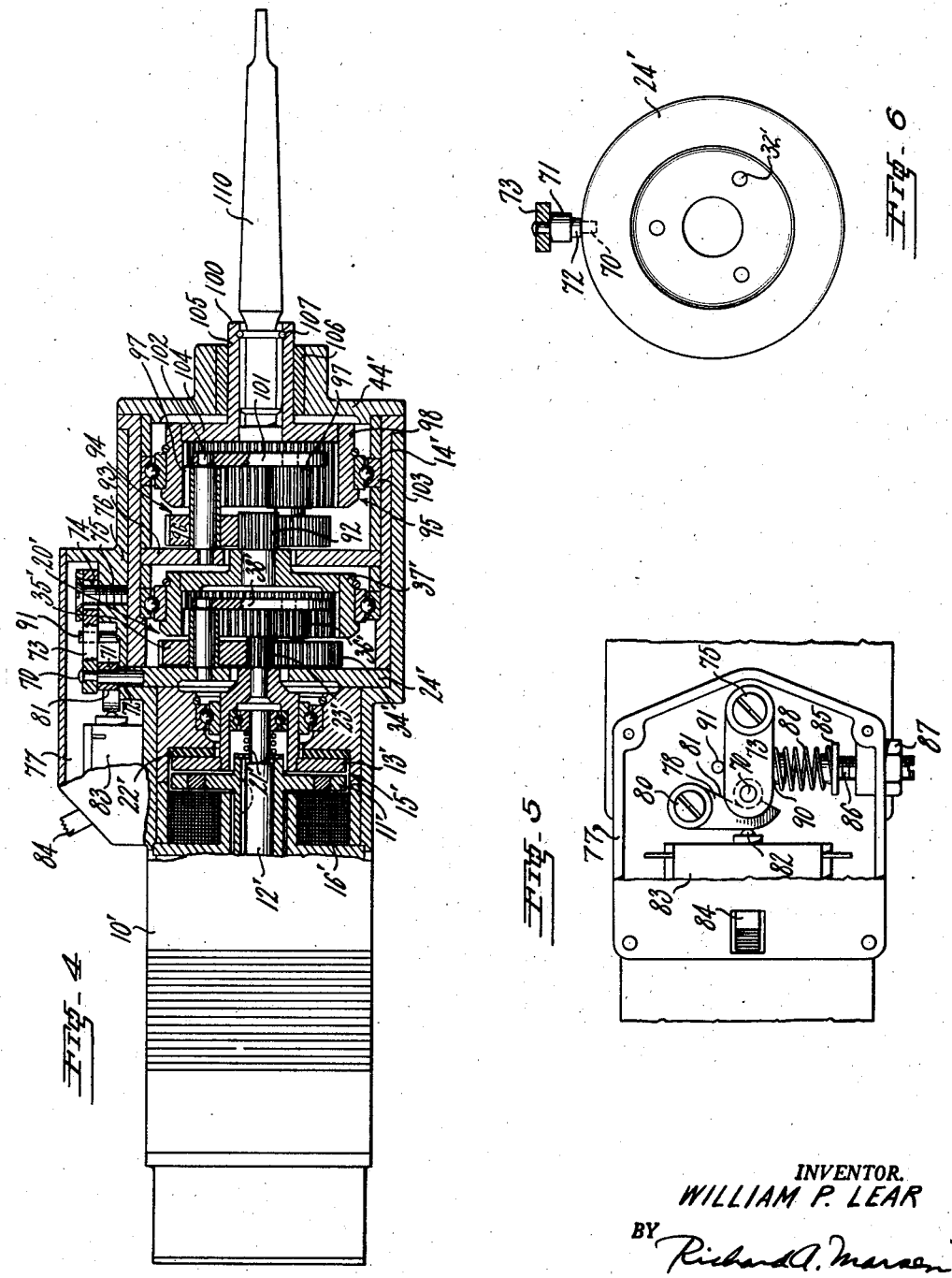

Patented July 2, 1946

2,403,094

UNITED STATES PATENT OFFICE 2,403,094

TORQUE PRESELECTING MECHANISM

William P. Lear, North Hollywood, Calif., assignor, by mesne assignments, to Lear, Incorporated, Grand Rapids, Mich., a corporation of Illinois Application August 17, 1943, Serial No. 499,010

7 Claims. (Cl. 192—.02)

1

This invention relates to a torque transmitting mechanism including an accurate torque transmission limiting arrangement.

The present invention provides a torque limiting device that accurately predetermines mechanical power or load output from a drive. It is useful for preventing breakage in mechanical drive systems. It is capable of numerous applications for limiting the torque applied to any load through a mechanical drive. Devices have been provided heretofore to accomplish this general purpose, but have been generally unsatisfactory. Such devices heretofore provided have effected deenergization of the power drive means when the torque exceeded a predetermined value, but had no provision for preventing overdrive of the driven parts after deenergization of the power drive means, whereby further undetermined power was imparted to the load. Other types of torque limiting devices have relied upon the slippage between a pair of friction clutch faces to control the amount of torque. As clutch faces wear after a certain amount of use and, even initially, are not uniform in their coefficients of friction, there resulted a wide variation in the limiting torque value in successive operations of the driving mechanism.

As a specific application, the invention is particularly useful with power driven tools such as power screw-drivers and power wrenches. In numerous cases, screws or bolts must be tightened to a predetermined torque factor, as in aircraft structures. Hitherto it has generally been necessary for an inspector to test each such fastening member and "experimentally" drive it home properly; at best a time consuming job and delaying factor in assembly line operations. With the present invention a continuously accurate torque limiting arrangement is provided in which there is no overdrive of the driven element when the power means is deenergized. Thus, a series of fastening elements, such as screws or nuts may be driven home directly with substantially exactly the same amount of torque each time.

It is therefore among the objects of this invention to provide a torque transmitting mechanism including means for accurately preselecting the amount of torque applied to a driven member; to provide a torque transmitting mechanism having a novel and accurate torque limiting arrangement including an abrupt acting clutch for disconnecting the power drive means from the driven member when the torque reaches its predetermined limiting value; to provide a torque transmitting mechanism including a high speed electric motor, a quick acting electromagnetic clutch, and means for deenergizing the motor and clutch when the torque exerted on a member driven thereby reaches a predetermined limiting value; to provide a power driven tool including means for accurately preselecting the amount of torque exerted by the tool element; and to provide a simple reliable and accurate arrangement for limiting the amount of torque applied to a driven member.

These and other objects, advantages and features of the invention will be apparent from the following description and accompanying drawings. In the drawings:

Fig. 1 is an elevation view partly in section of a general embodiment of the invention.

Fig. 2 is a cross-sectional view taken on the line 2—2 of Fig. 1.

Fig. 3 is a cross-sectional view taken on the line 3—3 of Fig. 1.

Fig. 4 is an elevation view, partly in section of a power driven tool embodying the invention.

Fig. 5 is a plan view of a torque limit switch included in the tool illustrated in Fig. 4.

Fig. 6 is an elevation view of a torque limiting element forming part of the power driven tool illustrated Fig. 4.

According to the present invention, a torque transmitting mechanism is provided, including a power driving means connected through a novel clutch and gearing to a driven member. The clutch is adapted to be abruptly effective simultaneously with energization of the power driving means or with the deenergization of the power driving means. A particularly low inertia driven member minimizes any lag overshooting action by the clutch. The gearing includes a normally stationary movable member, which, when a predetermined torque is exerted upon the driven member, moves to effect immediate deenergization of the power driving means and abrupt actuation of the clutch. Preferably, the clutch includes braking means for substantially instantaneously stopping motion of the driven member when the power driving means is deenergized.

Referring more particularly to Figs. 1, 2 and 3, a torque transmitting mechanism is illustrated comprising an electric motor 10 connected through an abruptly acting electromagnetic clutch 15 and reduction gearing 20 to a driven member 25. Electromagnetic clutch 15 is of the type described in my Patent No. 2,267,114 of December 23, 1941 for "Electromagnetic clutch," assigned to the same assignee as this case. It includes a driving member 11 keyed to the motor drive shaft 12, and a low inertia driven member 13 connected to the gearing 20. The clutch is mounted in a housing 14 secured to the casing of motor 10. Members 11 and 13 are made of magnetic material and an energizing winding 16 is provided for effecting magnetic and frictional coaction of the members 11 and 13. Member 13 is mounted in a bearing 17 in housing 14 and through bearing 18 on motor shaft 12. A spring 21 is provided to effect abrupt separation of members 11 and 13 upon deenergization of the clutch. Upon such deenergization, spring 21 immediately urges member 13 into engagement with a braking surface 22 to effect quick stoppage of the driven member 25. Member 13 terminates in a driving pinion 23 forming part of gearing 20.

Gearing 20 includes a normally stationary movable gear carrying member 24 disposed in housing 14. As shown more particularly in Fig. 2, housing 14 is provided with an opening 26. The portion of member 24 adjacent this opening is formed with gear teeth 27. Gear teeth 27 cooperate with the teeth on gear sector 28 forming part of a switch mechanism 30 mounted in an extension 31 of housing 14. Switch mechanism 30 will be described hereinafter.

A plurality of shafts 32, which may be three in number in the present instance, are mounted on member 24. Sleeves 33 are rotatably mounted on shafts 32 and fixed to each sleeve is a pinion 34. Each pinion 34 is a double pinion comprising a relatively large pinion gear 35 meshing with driving pinion 23, and a relatively small pinion gear 36 meshing with an internal ring gear 37. The coaction between pinion gears 36 and ring gear 37 is best illustrated in Fig. 3. The opposite ends of shafts 32 are supported in a plate 38. Gears 36 may be formed integrally with sleeves 33. Ring gear 37 is rotatably mounted on bearing 40 in the housing 14. The ring gear includes a disk portion 41 formed with a hub 42 mounted in bearing 43 in an end plate 44 for housing 14. Hub 42 is connected to flexible shafting 45 through the medium of a suitable driving connection 46.

Gear sector 28 is mounted on a shaft 47 extending through an end wall 48 of extension 31 and supported at its opposite end in an upstanding ear 50 in the extension. Shaft 47 is threaded as at 51 and provided with a lock nut 52. A spring 53 normally urges sector 28 away from ear or lug 50. Threaded portion 51 of shaft 47 provides for axial adjustment of gear sector 28. The upper end of gear sector 28 is adapted to engage either of a pair of limit switches 54, 55 which are included in the circuit of motor 10 and clutch 15. A suitable weight 56 may be mounted on the upper end of gear sector 28 to increase its sensitivity of movement.

Sector 28 is normally urged to a vertical position by means of adjusting means 57 and 58. Each adjusting means includes a spring 60 extending between a spring seat 61 on sector 28 and a spring seat 62 on a threaded shaft 63. Shafts 63 are threaded through opposite walls of extension 31 and are provided with locknuts 64. Adjusting means 57, 58 determine the limiting torque value exerted by the motor 10 through clutch 15 and gearing 20 on flexible shafting 45.

The operation of the device is as follows. Motor 10 and clutch 15 are connected in on-off circuit relation and for rotation in either a clockwise or a counter-clockwise direction through switches 54, 55 and circuit means in terminal box 67. Clutch 15 is connected in series or parallel circuit relation with motor 10. The necessary electrical connections between motor 11 and clutch 15 are made in terminal box 67. Manual starting and stopping of motor 10 is effected by a switch (not shown) connected to cable 68 which enters terminal box 67. Accordingly, when motor 10 is energized through closure of its circuit, winding 16 is likewise energized to cause abrupt magnetic and frictional coaction between clutch elements 11 and 13. This instantly connects motor shaft 12°to drive pinion 23. Mounting member 24 is normally stationary. Accordingly, rotation of pinion 23 will effect rotation of gears 34 and thus of ring gear 37. Therefore, the torque exerted by motor 10 is transmitted to flexible shafting 45. Adjusting means 57, 58 will previously have been set to restrain movement of gear sector 28 until the amount of torque exerted on shafting 45 reaches a preselected value.

Mounting member 24, when torque is being transmitted from pinion 23 to shafting 45, is continually urged to movement in one direction or the other. The sole restraining force is gear sector 28 and adjusting means 57, 58. Hence, when such preselected value of maximum torque is reached, the restraint is insufficient to prevent movement of mounting member 24. As this member moves in one direction or the other gear sector 28 is oscillated about its shaft 47 to compress one or the other of the springs 60. The upper end of the gear sector engages the actuating plunger 65 or 66 of the limit switches 54 or 55. The associated switch operates to open the circuit of motor 10 and clutch 15. The circuit of motor 10 being opened, the motor no longer exerts driving torque, and due to deenergization of clutch 15, its elements 11 and 13 abruptly separate under the influence of spring 21. Low inertia clutch disk 13 is snapped into engagement with braking surface 22 by spring 21. This action substantially instantaneously stops movement of flexible shafting 45. There is thus no overdrive of shafting 45. This results in accurate torque limit control.

The described torque limiting system is accurate and reliable in operation. It will be noted that mechanical clutch slippage is not relied upon for any function in the torque limiting action. The torque limiting action is provided by adjusting means 57 and 58 which, in effect, restrain movement of mounting member 24. These adjusting means may be preset, with proper consideration being given to the relative physical dimensions of member 24 and gear sector 28, to exert any predetermined amount of restraining force on sector 28 and member 24. As there is substantially no wear on adjusting means 57, 58, there is no undesirable variation in the action of the torque limiting means in successive operations. Due to the abrupt actuation of clutch 15 and the immediate engagement of low inertia driven disk 13 with braking surface 22, there is no overdrive. The device thus accurately limits the applied torque.

The device is capable of numerous applications. It is particularly applicable to motor actuated aircraft accessories, such as oil intercooler shutters, bomb bay doors, retractable landing gears, etc. In such applications, the device is preset to stop the driving action at a given torque limit, and thus prevents breakage of the driven devices. Figs. 4, 5 and 6 illustrate the application of the principles of the invention to a power driven tool. As a number of elements illustrated in Fig. 4 are the same as the corresponding elements in Figs. 1, 2 and 3, the same reference characters primed have been used to indicate the same or corresponding parts.

In the hand tool of Figs. 4, 5, and 6, electric motor 10' drives a pinion 23' through the medium of electromagnetic clutch 15'. A small high speed motor 10' is preferred in order to obtain the proper power with minimum bulk and weight for the hand tool. The electromagnetic clutch 15' is of the same type as 15 of Fig. 1, and is connected in series or parallel relation with the motor 10' so that it is energized when the motor circuit is closed, and is abruptly deenergized when the motor circuit is opened. The movable gear carrying member 24' differs somewhat from the member 24 of Figs. 1 and 2, as shown more particularly in Fig. 6. Instead of being formed with gear teeth, as in the first embodiment, a pin 70 is threaded into member 24' and a roller 71 is mounted on the pin between a washer 72 and an arm 73. Arm 73 is formed with an elongated recess 74 through which extends a screw 75 threaded into a shoulder 76 forming part of the switch housing 77. As shown more particularly in Fig. 5, a cam 78 is pivotally mounted as at 80 in housing 77 and has a cam surface 81 engaged by roller 71.

Cam 78 is in operative relation with a plunger 82 of a limit switch 83 incorporated in the motor control switch which is operated by the button 84 projecting outside housing 77. The torque adjusting means in this instance comprises a spring seat 85 on a bolt 86 threaded through the wall of housing 77. A lock nut 87 is provided to maintain bolt 86 in its adjusted position. Spring 88 extends between seat 85 and a spring seat 90 on arm 73. A stop pin 91 is provided to limit movement of arm 73 in one direction.

Pinions 34' are mounted on member 24' in the same manner as described previously. The pinions include relatively large pinion gears 35' engaging driving pinion 23' and relatively small pinion gears 36' engaging internal ring gear 37'. Ring gear 37' is connected to or may be integral with a driving pinion 92. Pinion 92 is part of a second reduction gearing 95 acting as a gear reducing drive between the torque limit control and a tool receiving chuck 100. For this purpose, a fixed gear carrying plate 93 is provided in the housing 14' and a plurality of pinions 94 are mounted on member 93 in the same manner as pinions 34' are mounted on member 24'. Each pinion 94 includes a relatively large pinion gear 96 and a relatively small pinion gear 97. Gears 96 engage driving pinion 92 and gears 97 engage ring gear 98. A supporting bracket or plate 101 is provided to receive the opposite ends of shafts 102 on which gears 94 are rotatably mounted. Ring gear 98 is mounted in bearing 103 in housing 14' and includes a disk member 104 which is formed with a hub 105 mounted in a bearing 106 in the end wall 44' of housing 14'. Hub 105 acts as a tool receiving chuck 100. It is adapted to interchangeably receive different driving tools such as screw-drivers, wrenches, and so forth. As illustrated, a screw-driver 110 is received in chuck 100 and retained therein by a snap ring 107.

The operation of this power driven tool is the same as that previously described. Adjusting means 86 is set for the predetermined value of maximum torque to be exerted on screw-driver 110. The adjustment is then locked by nut 87. During power transmission from motor 10' to chuck 100, movable mounting member 24' continually tends to rotate in housing 14'. Such rotation is resisted by spring 88 acting on arm 73 which is secured to pin 70 on member 24'. However, when the predetermined maximum value of torque has been reached, the force of spring 88 is overcome and member 24' moves. Roller 71 engaging cam surface 81 forces cam 78 inwardly against plunger 82. This opens the circuit of motor 10' and deenergizes clutch 15'. Motor 10' is thus abruptly mechanically disconnected from chuck 100. At the same time, spring 21' snaps clutch element 13' into engagement with braking surface 22'; this prevents any overdrive of chuck 100 and screw-driver 110, and results in accurate torque control. The torque limiting adjustment is accurate for successive actuations as there are substantially no wearing parts to change the setting of the torque adjustment. Hence, a number of screws may be driven home by screw-driver 110 with the same amount of maximum torque being exerted thereon in each instance.

While specific embodiments of the invention have been shown and described to illustrate the application of the principles thereof, it will be understood that the invention may be otherwise embodied without departing from such principles.

I claim:

1. Torque limiting apparatus comprising an electric motor; a driving pinion operatively associated with said electric motor; a driven member; reduction gearing connected to said driven member and including an internal ring gear connected to said driven member, a normally stationary gear carrying member oscillatable through a small arc and a plurality of pinions rotatably mounted on said gear carrying member and meshed with said driving pinion and said ring gear; adjustable resilient means biasing said gear carrying member against movement; said gear carrying member moving when the torque on said driven member reaches a predetermined amount; an electromagnetic clutch having a driving element connected to said electric motor and a driven element connected to said driving pinion, said clutch being connected in circuit relation with said motor and energized simultaneously therewith; a housing enclosing said gearing; switch means mounted in said housing and connected in the circuit of said motor and said clutch; and a device operatively associated with said gear carrying member and effective upon movement thereof to open said switch means to deenergize said motor and said clutch.

2. Torque limiting apparatus comprising an electric motor; a driving pinion operatively associated with said electric motor; a driven member; gearing connected to said driven member and including an internal ring gear connected to said driven member, a normally stationary gear carrying member oscillatable through a small arc and a plurality of pinions rotatably mounted on said gear carrying member and meshed with said driving pinion and said ring gear; adjustable resilient means biasing said gear carrying member against movement; said gear carrying member moving when the torque on said driven member reaches a predetermined amount; an electromagnetic clutch having a driving element connected to said electric motor and a driven element connected to said driving pinion, said clutch being connected in circuit relation with said motor and energized simultaneously therewith; a housing enclosing said gearing; switch means mounted in said housing and connected in the circuit of said motor and switch clutch; a device operatively associated with said gear carrying member and effective upon movement thereof to open said switch means to deenergize said motor and said clutch; a braking surface; and means abruptly urging said driven element into engagement with said braking surface upon deenergization of said clutch to prevent overdrive and effect an accurate torque limitation on said driven member.

3. A power driven tool comprising, in combination, an electric motor; a chuck adapted to interchangeably receive tool elements; a driving pinion operatively associated with said electric motor; gearing operatively associated with said chuck and including an internal ring gear in driving relation with said chuck, a normally stationary gear carrying member oscillatable through a small arc and a plurality of pinions rotatably mounted on said gear carrying member and meshed with said driving pinion and said ring gear; adjustable resilient means biasing said gear carrying member against movement; said gear carrying member moving when the torque on said chuck exceeds a predetermined amount; an electromagnetic clutch-brake unit including a clutch having a driving element connected to said electric motor and a driven element connected to said driving pinion, said clutch being connected in circuit relation with said motor and energized simultaneously therewith; and a device operatively associated with said gear carrying member and effective on movement thereof to immediately interrupt the energization of said electric motor and to simultaneously deenergize said clutch and engage said brake to abruptly stop motion of said chuck.

4. A power driven tool comprising, in combination, an electric motor; a chuck adapted to interchangeably receive tool elements; a driving pinion operatively associated with said electric motor; gearing operatively associated with said chuck and including an internal ring gear in driving relation with said chuck, a normally stationary gear carrying member oscillatable through a small arc and a plurality of pinions rotatably mounted on said gear carrying member and meshed with said driving pinion and said ring gear; adjustable resilient means biasing said gear carrying member against movement; said gear carrying member moving when the torque on said chuck exceeds a predetermined amount; an electromagnetic clutch having a driving element connected to said electric motor and a driven element connected to said driving pinion, said clutch being connected in circuit relation with said motor and energized simultaneously therewith; a device operatively associated with said gear carrying member and effective on movement thereof to immediately interrupt the energization of said electric motor and to simultaneously deenergize said clutch; a braking surface; and means urging said driven element into engagement with said braking surface upon deenergization of said clutch to abruptly stop motion of said chuck.

5. A torque transmitting mechanism comprising, in combination, an electric motor; a driving pinion operatively associated with said electric motor; a casing secured to said motor and having an opening; a driven member; reduction gearing mounted in said casing and connected to said driven member, said gearing including an internal ring gear connected to said driven member, a gear carrying plate disposed adjacent said opening and a plurality of pinions rotatably mounted on said plate and meshed with said driving pinion and said ring gear, said plate oscillating about the axis of said driving pinion and driven member reaches a predetermined amount; an electromagnetic clutch-brake unit including a clutch having a driving element connected to said electric motor and a low inertia driven element connected to said driving pinion, said clutch being connected in circuit relation with said motor and energized simultaneously therewith; a switch housing on said casing adjacent said opening; switch means mounted in said housing and connected in the circuit of said motor and said clutch; a switch operator operatively associated with said plate and said switch means and effective to open said switch means in response to oscillation of said plate, to deenergize said motor and clutch and engage said brake to instantly stop motion of said driven member; and adjustable means restraining opening of said switch means.

6. A torque transmitting mechanism comprising, in combination, an electric motor; a driving pinion operatively associated with said electric motor; a casing secured to said motor and having an opening; a driven member; reduction gearing mounted in said casing and connected to said driven member, said gearing including an internal ring gear connected to said driven member, a gear carrying plate disposed adjacent said opening and a plurality of pinions rotatably mounted on said plate and meshed with said driving pinion and said ring gear, said plate oscillating about the axis of said driving pinion and driven member when the torque on said driven member reaches a predetermined amount, an electromagnetic clutch having a driving element connected to said electric motor and a low inertia driven element connected to said driving pinion, said clutch being connected in circuit relation with said motor and energized simultaneously therewith; a switch housing on said casing adjacent said opening; switch means mounted in said housing and connected in the circuit of said motor and said clutch; a switch operator operatively associated with said plate and said switch means and effective to open said switch means in response to oscillation of said plate, to deenergize said motor and clutch; adjustable means restraining opening of said switch means; a braking surface; and means abruptly urging said driven element into engagement with said braking surface upon deenergization of said clutch to prevent overdrive of said drive member.

7. A power driven tool comprising, in combination; an electric motor; a driving pinion operatively associated with said electric motor; a casing secured to said motor and having an opening; a driven pinion; a chuck adapted to interchangeably receive tool elements; reduction gearing mounted in said casing and operatively associated with said chuck, said gearing including a first internal ring gear connected to said chuck, a fixed gear carrying plate, a plurality of pinions rotatably mounted on said plate and meshed with said driven pinion and said first ring gear, a second internal ring gear connected to said driven pinion, a movable gear carrying plate disposed adjacent said opening, said plate oscillating about the axis of said driving pinion when the torque on said chuck exceeds a predetermined amount and a plurality of pinions rotatably mounted on said movable plate and meshed with said driving pinion and said second internal ring gear; an electromagnetic clutch having a driving element connected to said electric motor and a low inertia driven element connected to said driving pinion, said clutch being connected in circuit relation with said motor and energized simultaneously therewith; a switch housing on said casing adjacent said opening; switch means mounted in said housing and connected in the circuit of said motor and said clutch; a switch operator operatively associated with said movable plate and switch means and effective to open said switch means, in response to oscillation of said movable plate, to deenergize said motor and clutch; adjustable means restraining opening of said switch means; a braking surface; and means abruptly urging said driven element into engagement with said braking surface upon deenergization of said clutch to abruptly stop motion of said chuck.

WILLIAM P. LEAR.